Figure 1:
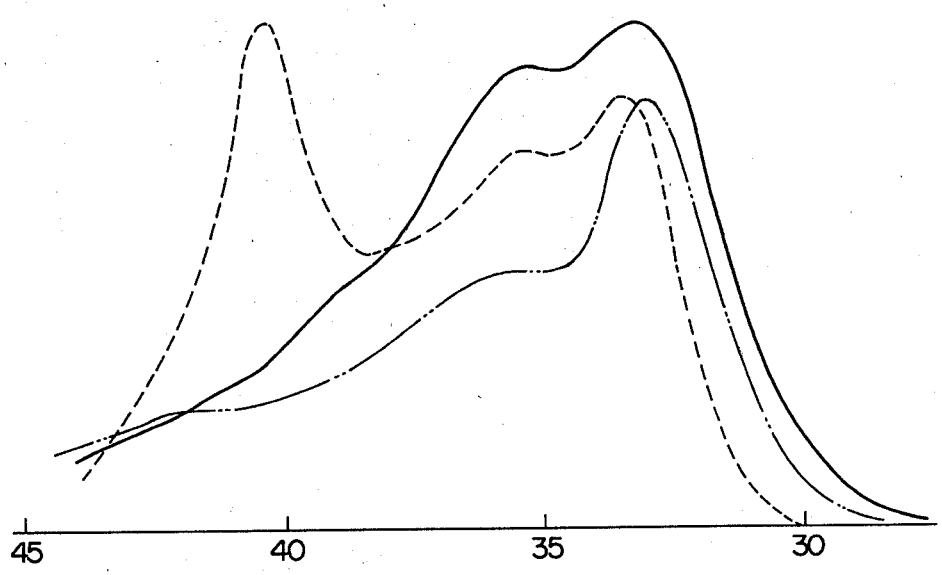

United States Patent [19]

Homma et al.

[11] 4,398,016

[45] Aug. 9, 1983

[54] PROCESS FOR PRODUCING A RESIN FOR PRINTING INK, AND A COMPOSITION COMPRISING SAID RESIN

[75] Inventors: Minoru Homma; Noboru Okoshi; Kin-ichi Kudo; Soichi Shimoyama, all of Chiba; Nansei Tashiro, Sodegaura, all of Japan

[73] Assignee: Dainippon Ink and Chemicals, Inc., Tokyo, Japan

[21] Appl. No.: 302,850

[22] Filed: Sep. 16, 1981

[30] Foreign Application Priority Data

Sep. 30, 1980 [JP] Japan ................................ 55-135184
Sep. 30, 1980 [JP] Japan ................................ 55-135185
Sep. 30, 1980 [JP] Japan ................................ 55-135186

[51] Int. Cl.³ .................... C08G 8/32; C08G 8/34; C09D 11/06; C09D 11/08
[52] U.S. Cl. .................................. 528/158.5; 106/29; 106/30; 260/DIG. 38; 523/160; 528/129; 528/161

[58] Field of Search .................... 528/158.5, 161, 129; 523/160, 161; 106/29, 30; 260/DIG. 38

[56] References Cited

U.S. PATENT DOCUMENTS 2,064,614 12/1936 Kneale et al. ........................ 528/129
2,142,833 1/1939 Benton et al. .................... 528/158.5
2,217,363 10/1940 Greth et al. ...................... 528/158.5
2,271,804 2/1942 Root ................................. 528/158.5
2,321,626 6/1943 Rosenblum ......................... 528/129
2,324,550 7/1943 Wolfe ..................................... 106/30
2,550,961 5/1951 Bradley ............................ 528/158.5
4,148,767 4/1979 Spicer et al. .......................... 106/29

Primary Examiner—Ronald W. Griffin
Attorney, Agent, or Firm—Sherman & Shalloway

[57] ABSTRACT

A process for producing a rosin-modified phenolic resin modified with an animal or vegetable oil, which has superior properties as a vehicle for offset printing inks; and a resin composition for printing inks comprising the oil-modified and rosin-modified phenolic resin obtained by the aforesaid process as an essential ingredient.

6 Claims, 2 Drawing Figures

PROCESS FOR PRODUCING A RESIN FOR PRINTING INK, AND A COMPOSITION COMPRISING SAID RESIN

This invention relates to a process for producing an oil-modified and rosin-modified phenolic resin having superior properties as a vehicle for offset printing inks, and to a resin composition for printing inks having good storage stability and comprising the oil-modified and rosin-modified phenolic resin obtained by the aforesaid process as an essential ingredient.

Rosin-modified phenolic resins have gained most widespread use as vehicles for offset printing inks. With the development of the printing arts, the speeds of printing have become increasingly high, and requirements for various ink properties such as gloss and drying property (so-called "set") have been increasingly rigorous. Various types of resins have been developed in order to meet these requirements.

For example, in order to increase solubility in aliphatic solvents, the use of various hydrocarbon resin-modified and rosin-modified phenolic resins (Japanese Patent Publications Nos. 27492/1971 and 38113/1978) or the use of dicyclopentadiene-modified rosin-modified phenolic resins (Japanese Laid-Open Patent Publication No. 125494/1978) has been proposed. Furthermore, a method comprising utilizing α,β-unsaturated polybasic acids (Japanese Patent Publication No. 11354/1971) and a method using hardened rosin (Japanese Patent Publication No. 40669/1970) have been reported in order to improve the properties of printing inks. Although these prior art techniques give satisfactory results in the individual properties required, they have still been unable to provide an excellent balance of gloss and set which is most important in printing ink vehicles. In the prior art, a vehicle having good gloss is slow setting, and conversely, a vehicle which is fast setting has poor gloss.

The present inventors have made detailed investigations about various factors which affect gloss and set of inks in order to overcome the difficulties of the prior art, and found that if in the components of a printing ink which has been solidified after its transfer to an object to be printed, the gloss of the ink becomes better as the amount of the vehicle based on the pigment is larger and the vehicle has better dispersibility, and the set of the ink is faster as the softening point of the resin becomes higher. Furthermore, they have found that an oil-modified and rosin-modified phenolic resin having an animal or vegetable oil incorporated in the resin structure can simultaneously bring about superior gloss and set. In accordance with this invention, it has been found that an ink having superior gloss and set is obtained by using an oil-modified and rosin-modified phenolic resin having an oil length of 5 to 40% alone, or a resin composition substantially having an oil content of 5 to 40% by including some amount of an animal or vegetable oil into the resin or mixing it with a rosin-modified phenolic resin which does not contain such an oil component and/or a hydrocarbon resin; that if an oil-modified and rosin-modified phenolic resin having an oil length of more than 40% is used alone, an ink having superior set is difficult to obtain, but if its oil length is not more than 70%, an ink having an unnegligible significance in a balance of gloss and set can be obtained by blending such an oil-modified resin with another hard resin so that the content of the oil component becomes substantially 5 to 40%; thus, the range of polymer blends is broadened, and the printability of the blended polymer itself can be fully utilized; and that since all of the above resin compositions contain an oil component necessary and sufficient as an ink varnish, no cooking at high temperature is required even when another resin is used in combination, and the desired resin composition can be obtained only by blending at low temperatures. Thus, in the course of accomplishing the present invention, a composition containing an oil-modified and rosin-modified phenolic resin having an oil length of 5 to 70% and having an oil component content of 5 to 40% was obtained. The present inventors, on further investigations, found that although the oil-modified and rosin-modified phenolic resin has the aforesaid characteristics, its solubility in solvents for resins during storage is reduced with the passage of time, and this defect can be eliminated without impairing its superior characteristics by adding a suitable amount of an antioxidant. This discovery has led to the accomplishment of the present invention.

According to this invention, there is provided a process for producing an oil-modified and rosin-modified phenolic resin for printing inks modified with animal or vegetable oil components, which comprises (I) reacting in a single step (a) a phenol, (b) a formaldehyde-yielding substance, (c) an animal or vegetable oil having an iodine value of 100 to 210 or containing a hydroxyl group [to be sometimes abbreviated "oil component (c)"], (d) a rosin, (e) an alcohol (i.e. a monohydric alcohol and a polyhydric alcohol) and if desired, (f) an acid (i.e. a monobasic acid and a polybasic acid) and a hydrocarbon resin (g);

(II) partially or wholly esterifying at least two components, selected from the components (d), (e), (f) and (g), which can be esterified with each other to form a pre-condensate, and then reacting the pre-condensate with the remainder, i.e. the three components (a), (b) and (c) and at least one of the remaining components (d), (e), (f) and (g) which have not been used in the above esterification reaction; or (III) subjecting the components (c) and (e) partially or wholly to ester-interchange reaction to form an ester-interchange product and reacting it further with the remaining components (a), (b) and (d) and if desired, at least one component selected from the other components excepting (c) and (e).

According to this invention, there are also provided a resin composition comprising as an essential ingredient the oil-modified resin so obtained, particularly a resin composition comprising as a main ingredient an oil-modified resin having an oil length of 5 to 70% and an acid value of not more than 30; a resin composition prepared by blending this oil-modified resin with another rosin-modified phenolic resin which does not contain an oil component and/or a hydrocarbon resin (g); and a resin which consists of the above resin composition and an antioxidant.

Examples of the phenol (a) used in the invention are phenol, cresol, p-t-butylphenol, p-octylphenol, p-nonylphenol and bisphenol A.

Typical examples of the formaldehyde-yielding substance (b) are formalin and paraformaldehyde.

The suitable amount of the formaldehyde-yielding substance (b) fed is 1.0 to 2.5 moles, preferably 1.5 to 2.0 moles, per mole of the phenol (a). The suitable total amount of the phenol (a) and the formaldehyde-yielding substance (b) is 10 to 35 parts by weight, more preferably 20 to 30 parts by weight, per 100 parts by weight of the entire resin-forming components. If it exceeds 35 parts by weight, the amount of a self-condensed product of the components (a) and (b) increases, and a printing ink containing the resulting product has a much increased viscosity. If, on the other hand, it is less than 10 parts by weight, the molecular weight of the resulting resin is low, and that portion of the resin which reacts with the oil component (c) decreases. As a result, the viscosity of the ink becomes too low, and the emulsification resistance of the ink is reduced.

Typical examples of the oil component (c) are animal or vegetable oils having an iodine value of 100 to 210, such as tall oil, cotton seed oil, soybean oil, safflower oil, dehydrated castor oil, linseed oil, tung oil, cattlefish oil, sardine oil and fatty acids of these, or animal or vegetable oils containing a hydroxyl group such as castor oil. Needless to say, polymerized oils generally used in preparing varnishes, such as a di- to tetra-mer of linseed oil or higher polymers thereof, can also be used.

The oil component (c) may be used singly, or if required, two or more such oil components may be used in combination. The suitable amount of the component (c) is 5 to 70 parts by weight, preferably 5 to 40 parts by weight, per 100 parts by weight of the entire oil-modified resin-forming components. If the component (c) is used in an amount of more than 40 parts by weight, the amount of the unreacted oil component in the resin increases relatively, and the softening point of the resin tends to become too low. The use of a resin (for example, the one used in an amount of 70 parts by weight as oil component) having a large content of such an unreacted oil component and therefore too low a softening point as a main ingredient of a resin composition (the one used in an amount of more than 75% in the resin composition) for printing inks does not provide a good balance of gloss and set. If the amount of the component (c) is less than 5 parts by weight, the effect of modification by the oil component (c) is very much reduced.

It is unsuitable to use the oil-modified resin containing more than 40 parts by weight of the oil component (c) either singly or in the form of a composition containing it as a main ingredient for preparing printing ink varnishes. If, however, it is used together with the rosin-modified phenolic resin which is not modified with an oil component or hydrocarbon resin (g), the use of an oil-modified resin having an oil length of up to 70% is effective.

The component (c) should contain a hydroxyl group in the molecule, or have an iodine value of at least 100. If the iodine value is less than 100, the reactivity of the component (c) with the resol-type phenol/formaldehyde initial condensation product prepared from the components (a) and (b), or with the component (d) is reduced, and consequently, a good balance of gloss and set contemplated in this invention cannot be obtained. The iodine value may be considerably high, but animal and vegetable oils now commercially available have an iodine value of 210 at the highest.

The rosins (d) include gum rosin, wood rosin, tall oil rosin, hardened rosin, etc.

The alcohols (e) typically include polyhydric alcohols such as ethylene glycol, diethylene glycol, propylene glycol, dipropylene glycol, butylene glycol, neopentyl glycol, hexanediol, hexanetriol, glycerol, trimethylolethane, trimethylolpropane and pentaerythritol; and higher monohydric alcohols such as hexyl alcohol, nonyl alcohol or octyl alcohol. Trihydric or higher alcohols are especially preferred.

Typical examples of the acid (f) are monobasic acids such as benzoic acid or p-t-butylbenzoic acid, and polybasic acid such as succinic acid, adipic acid, maleic acid (anhydride), itaconic acid (anhydride), phthalic acid (anhydride) or trimellitic acid. Usually, the acid (f) is not particularly required, but it is useful when designing resins having a particularly high molecular weight and a high softening point.

The hydrocarbon resin (g) includes aliphatic, aromatic and alicyclic resins having a number average molecular weight of generally 500 to 5,000 and a softening point of at least 70° C., preferably 120° to 160° C., and the derivatives thereof, which are obtained, for example, by polymerizing isoprene, cyclopentadiene or dicyclopentadiene which is a $C_5$ fraction obtained as a by-product in the thermal cracking of petroleum naphtha, or a styrene derivative or indene which is a $C_9$ fraction obtained in the thermal cracking of petroleum naphtha. Generally, the use of the hydrocarbon resin (g) is effective in increasing solubility in solvents and emulsification resistance in preparing varnishes, but is frequently an adverse factor on the gloss of ink. The suitable amount of the component (g) is not more than 30 parts by weight per 100 parts by weight of the entire resin-forming components.

At least two components, selected from the components (d), (e), (f) and (g), which can be esterified with each other to form a condensate should have a total hydroxyl group to total carboxylic acid equivalent ratio of preferably 0.7 to 1.3, more preferably 0.9 to 1.2. If the equivalent ratio exceeds 1.3, the hydroxyl groups become excessive, and the resulting resin becomes hydrophilic. Hence, the resin is liable to be emulsified by dampening water used during printing. On the other hand, if the equivalent ratio is less than 0.7, the acid becomes excessive and the molecular weight of the resin is reduced and its softening point becomes too low.

The pre-condensate [to be preferred to as the component (h)] may be called a kind of rosin ester obtained by partially or wholly esterifying at least two components, selected from the components (d), (e), (f) and (g), which can be esterified with each other. The aforesaid ester-interchange product [to be referred to as component (i)] is obtained by ester-interchange of the components (c) and (d).

In more detail, the process of this invention (I) to (III) are as follows:

PROCESS (I)

The phenol (a), formaldehyde-yielding substance (b), oil component (c), rosin (d) and alcohol (e), and if desired, the acid (f) and/or the hydrocarbon resin (g) are reacted at 100° to 160° C. for 1 to 9 hours in the presence of, if required, a known catalyst such as a hydroxide, oxide or acetate of calcium, magnesium or zinc or a tertiary amine added in an amount of 100 to 10,000 ppm, and further reacted at 200° to 280° C. for 3 to 10 hours.

PROCESS (II)

Those components, selected from the components (d), (e), (f) and (g), which can be esterified with each other, either wholly or partly, are reacted at 200° to 260° C. Then, to the resulting pre-condensate (h) are added the remaining components, i.e. the components (a), (b) and (c) and at least one of (d), (e), (f) and (g)

which have not been used in obtaining the precondensate (h).

PROCESS (III)

The components (c) and (e) are reacted at 230° to 240° C. in the presence of an ester-interchange catalyst such as lithium hydroxide. Then, to the resulting ester-interchange product (i), the remaining components, i.e. the components (a) and (b) at least one of the components (d), (f) and (g) are added, and if required the above catalyst is also added. The mixture is reacted at a temperature of 100° to 160° C. for 1 to 9 hours, and then further reacted at a temperature of 200° to 280° C. for 3 to 9 hours.

By the above processes, the Diels-Alder type addition of the components (a), (b), (c) and (d) and the esterification condensation of the component (e) and if required, the component (f) take place to give a product in the form of a resin.

The oil-modified and rosin-modified phenolic resin obtained by the process of this invention preferably has a number average molecular weight of about 500 to about 5,000 calculated in terms of polystyrene. Basically, this product may be regarded as an addition-condensation product formed by (1) the Diels-Alder addition of the semidrying or drying animal or vegetable oil or its fatty acid (c), the rosin (d) and the resol-type phenol/formaldehyde initial condensation product formed during the course of the reaction, and (2) condensation by the esterification reaction between the carboxyl group in the rosin (d) or the like and the hydroxyl group in the alcohol (e) or the like.

In contrast, a product obtained by cooking a rosin-modified phenolic resin with a stand oil at 220° to 250° C. for 1 to 2 hours is used in conventional ink varnishes. The rosin-modified phenolic resin, however, has low reactivity. In the preparation of a rosin-modified phenolic resin by the reaction of a resol-type phenol/formaldehyde initial condensation product with a rosin, the active groups such as a methylol or methylene ether group of the resol-type phenol/formaldehyde initial condensation product and the active groups such as a conjugated double bond of the rosin are consumed almost completely by the formation of a coumarone ring between said condensation product and said rosin or by the self-condensation of said condensation product in the course of the reaction with said rosin. Hence, the rosin-modified phenolic resin obtained scarcely contains these active groups. Even when such a rosin-modified phenolic resin and stand oil are heated together, the reaction scarcely takes place between them, and the resulting varnish is merely a simple physical mixture of both. This fact is clearly substantiated by the results of measurement of the molecular weight distribution of the product by gel permeation chromatography (GPC). One example is shown in the attached drawings.

Figure 2:
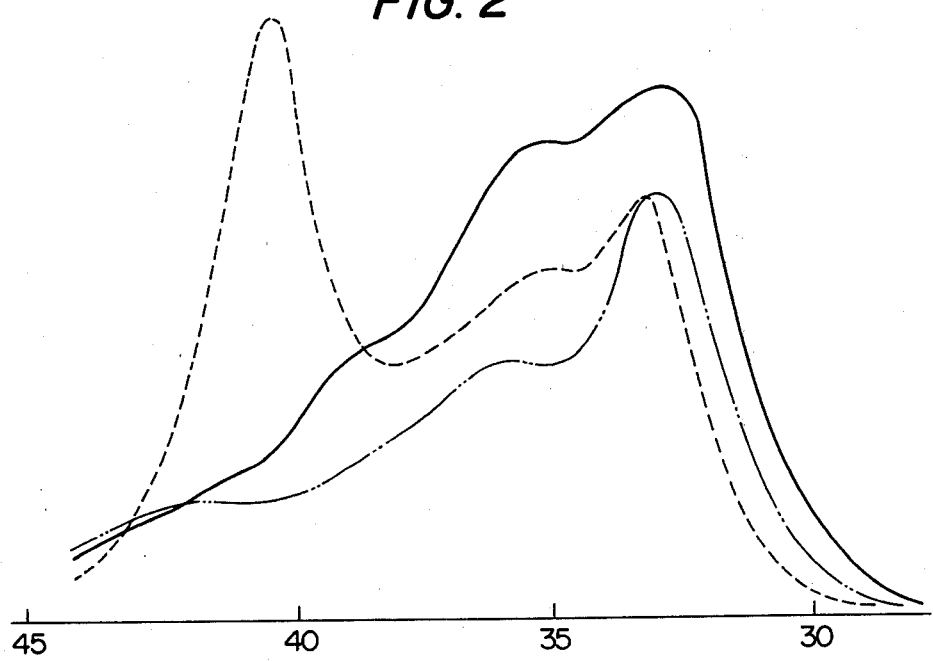

In the attached drawings, FIGS. 1 and 2 are gel permeation chromatographic charts showing the molecular weight distribution of the resin obtained by the process of this invention in comparison with that of a conventional resin.

FIG. 1 shows the case where the amount of the oil component (linseed oil) is 30%, and FIG. 2, the case wherein the amount of the oil component (linseed oil) is 40%. The solid lines in these figures refer to the resin of this invention (oil-modified and rosin-modified phenolic resin); the two-dot chain line, to a rosin-modified phenolic resin; and the dotted line, to a product obtained by cooking a rosin-modified phenolic resin and an oil at 250° C. for 6 hours.

The measurement by GPC was conducted under the following conditions.

Instrument: Model 200 (a product of Waters Associate Co. of U.S.A.)
Column: 4 feet in length and ⅜ inch in diameter
Filler: "μ-Styragel" (Waters Associate Co., U.S.A.)

FIGS. 1 and 2 show that the product obtained by cooking under very severe conditions (250° C., 6 hours) (shown by the dotted lines) still contained a free oil (linseed oil), but that the products of the invention (shown by the solid lines) scarcely contain an appreciable amount of a free oil, and the distribution has shifted to a high-molecular-weight region.

Accordingly, a conventional ink based on the mixture of rosin-modified phenolic resin and stand oil as a varnish has the defect that after printing, the free oil readily penetrates through the paper, and consequently, the set of the ink is fast but its gloss tends to be low.

This defect can be eliminated by introducing an oil component into a rosin-modified phenolic resin by a chemical reaction. Since the resin obtained by the process of this invention scarcely contains the unreacted oil (this is however limited to resins having an oil length of up to 50%, and those having an oil length of more than 50% evidently contain an unreacted oil component), an ink containing such a resin as a vehicle gives a printed matter of very good gloss with reduced penetration of the vehicle in the paper. Moreover, by dint of the cross-linking effect as a result of the oxidative polymerization of the oil, even a resin having a low softening point gives a fast set and provides an ink film having excellent abrasion resistance.

Furthermore, the marked improvement of the pigment wetting property of the resin obtained by the process of this invention, which is brought about presumably because the oil is chemically combined with the resin and is present therein uniformly, is considered to be another great factor which is conducive to this excellent gloss.

It is surprising that the resin has a very good behavior of emulsification by dampening water (namely, is difficult of emulsification by the dampening water), and the stability of the resulting ink on the printing press is greatly increased.

The oil-modified and rosin-modified phenolic resin of this invention can be used as a vehicle of printing inks in the same way as conventional rosin-modified phenolic resins. As a matter of course, it does not require cooking with the oil component because the oil has been introduced into it by a chemical bonding. In other words, the resin of this invention can be directly dissolved in a solvent to form an ink, or it can be formed into an ink by adding small amounts of an oil such as linseed oil, or another hard resin, etc.

Conventional phenolic varnishes obtained by cooking resol-type phenolic resins and animal or vegetable oils at 150° to 250° C. in a known conventional manner are useful by themselves as rust-proofing paints, etc. But for use as printing ink varnishes, they give poor gloss, and because they have an unsuitable emulsification behavior with respect to dampening water, the printing stability of the ink becomes poor, and the ink is solidified. Furthermore, a conventional varnish obtained by cooking a rosin-modified maleic resin (to be abbreviated "a rosin ester" hereinbelow) and an animal or vegetable oil at an elevated temperature has good gloss but suffers from the defect that it has low resistance to dampening water. A varnish obtained by cooking a rosin-modified phenolic resin and an animal or vegetable oil is now currently used predominantly as a printing ink varnish. It has been developed in a form useful as a printing ink varnish in which the advantages and defects of the two prior art varnishes set off each other.

In view of this state of art, one might think that if the varnish-forming methods used in preparing the phenolic varnish and the rosin-modified maleic varnish are carried out together, the same resin as that obtained by the process of this invention would be able to be obtained with equal simplicity. This never happens as stated hereinabove. The technique currently employed is to obtain a printing ink varnish by cooking the rosin-modified phenolic resin and an oil, and this technique has not been modified so far. This fact clearly demonstrates that the resin in accordance with this invention can never be obtained otherwise. In fact, for the following two reasons, it is inconvenient to mix a resol-type phenolic resin having a softening point of more than 100° C. and having a high degree of condensation and a rosin ester with an oil, and react the three. Firstly, it is difficult to inhibit the self-condensation of the resol-type phenolic resin in the melting step. Should the self-condensation be able to be inhibited by some technique, the phenolic resin having such a high degree of condensation has too high a viscosity to be suitably used in ink varnishes. Secondly, it is difficult to impart properties required for printing suitability with respect to dampening water to the resulting resin, presumably because in the resulting resin, the phenolic resin and the rosin ester component are present in the form of blocks.

As stated hereinabove, the oil-modified and rosin-modified phenolic resin for printing inks obtained by the process of this invention can provide a printing ink with both high gloss and fast set which have not been able to be attained by any means previously proposed. The oil-modified and rosin-modified phenolic resin obtained by the process of this invention preferably has an acid value of not more than 30. The oil-modified resin, as stated hereinabove, can be used as a printing ink vehicle in the same way as rosin-modified phenolic resins which have heretofore been used in general. Since the oil has been introduced into the resin by a chemical bonding, the resulting resin, of course, does not require cooking with the oil component. The resin of this invention, especially that having an oil length of 5 to 40%, can be directly dissolved in a solvent to form an ink. Or it may be formed into an ink by adding small amounts of an oil such as linseed oil or another kind of hard resin. With an oil-modified and rosin-modified phenolic resin having an oil length of more than 40%, however, it is inadequate just to dissolve it directly to form an ink, or just to form it into an ink by adding a small amount of an oil such as linseed oil or another kind of hard resin. Thus, depending upon its oil length, it is preferably used in the form of a composition prepared by mixing with a hard resin such as a rosin-modified phenolic resin not containing an animal or vegetable oil component or the hydrocarbon resin (g). When such a composition is used as a varnish, the effectiveness of the oil-modified resin can be retained even with regard to oil-modified resins having an oil length of as long as 70%.

The rosin-modified phenolic resin not containing an animal or vegetable oil component is suitably an ordinary rosin-modified phenolic resin free from an oil component and having a softening point of at least 100° C. and preferably 130° to 170° C., which is produced by a conventional technique from the phenol/formaldehyde initial condensation product (h), the rosin (d), the polyhydric alcohol (e) and if required, the acid (f).

Typical examples of commercially available hydrocarbon resins (g) include "Hi-rez T-100X" (a trademark for a product of Mitsui Petrochemical Industries, Ltd.), "Escorez 1102" (a tradename for a product of Esso Petroleum Co., Ltd.), "Quintone C-200S" (a tradename for a product of Nippon Zeon Co., Ltd.), and "Neopolymer CP-1" (a tradename for a product of Nippon Oil Co., Ltd.).

The resin composition for printing inks in accordance with this invention having the aforesaid construction is a composition containing the oil-modified and rosin-modified phenolic resin having an oil length of 5 to 70% as an essential component and the rosin-modified phenolic resin free from an oil component and/or the hydrocarbon resin as a subsidiary component, the content of the oil component in the composition being adjusted to 5 to 40% by weight, preferably 15 to 35% by weight. If the content of the oil component exceeds 40% by weight, the resin composition has too low a softening point, and the ink set becomes slow. Consequently, the printed matter develops a blocking tendency, and cannot be used in practical applications. On the other hand, if the content is less than 5% by weight, the proportion of the oil component from the oil-modified and rosin-modified phenolic resin in the resin composition decreases, and a good balance of gloss and set which is the inherent property of the oil-modified and rosin-modified phenolic resin cannot be exhibited. At the same time, the composition has too high a softening point and has poor toughness, with the result that the resulting printed matter does not have suitable properties.

As one embodiment, the present invention embraces a resin composition comprising the aforesaid oil-modified and rosin-modified phenolic resin as an essential component and an antioxidant, too. Specifically, the present invention also provides a resin composition for printing inks, said composition comprising the oil-modified and rosin-modified phenolic resin having an acid value of not more than 30 and obtained by the various methods described hereinabove and an antioxidant as main ingredients, the amount of the antioxidant being 0.01 to 5 parts by weight per 100 parts by weight of the oil-modified and rosin-modified phenolic resin.

The antioxidant may basically be any substances which have the ability to prevent oxidation, and are compatible with the oil-modified and rosin-modified phenolic resin. Typical examples are phenolic antioxidants such as 2,6-di-t-butylphenol and 2,4-dimethyl-6-t-butylphenol; phosphorus-type antioxidants such as triphenyl phosphite and tris-(nonylphenyl phosphite); sulfur-type antioxidants such as dilauryl-3,3'-thio-dipropionate; amine-type antioxidants such as phenyl-α-naphthylamine and N,N'-diphenyl-p-phenylenediamine; imidazole-type antioxidants such as 2-mercaptobenzimidazole; and sulfur-phenol type antioxidants such as 4,4'-thio-bis-(6-t-butyl-3-methylphenol).

The amount of the antioxidant is usually 0.01 to 5 parts by weight per 100 parts by weight of the oil-modified and rosin-modified phenolic resin although varying with the type of the antioxidant. Of course, two or more of these anti-oxidants may be used in combination. The use of the antioxidants in an amount exceeding the above limit poses no problem from the standpoint of the storage stability of the composition itself, but when an ink film printed by using such a composition is hardened, the antioxidant greatly impairs the crosslinking of the oil component by air oxidation, and an ink film having high durability cannot be formed.

The resin composition so obtained can be used as a printing ink vehicle in the same way as in the rosin-modified phenolic resins generally used heretofore. Since the oil has already been introduced into the resin by a chemical bonding, the composition, of course, neither requires cooking with the oil component. The resin composition can be directly dissolved in a solvent to form an ink. Or it may be formed into an ink by adding a small amount of stand oil.

As stated hereinabove, known conventional resins may be added to the resin composition of this invention, and a conventional rosin-modified phenolic resin free from an oil component is one of them.

The use of such a characteristic composition of this invention can provide a printing ink which has excellent gloss and set simultaneously and also excellent storage stability.

The following Examples illustrate the present invention more specifically. All parts in these examples are by weight unless otherwise specified.

EXAMPLE 1

A 2-liter four-necked flask equipped with a stirrer, a thermometer and a refluxing device was charged with 500 parts of rosin, 100 parts of linseed oil, 50 parts of glycerol, 6 parts of triethylamine and 100 parts of toluene, and they were mixed to form a uniform solution. Then, 200 parts of p-octylphenol and 60 parts of formaldehyde were added, and the mixture was maintained at 100° C. for 3 hours. While removing toluene and water from the reaction system, the mixture was heated to 250° C. over 4 hours, and then maintained at 250° to 260° C. for 8 hours to perform esterification reaction while removing water of condensation. The resulting resin had an acid value of 20 and a softening point of 126° C.

EXAMPLE 2

A 2-liter four-necked flask equipped with a stirrer, a thermometer, and a refluxing device was charged with 500 parts of rosin, 200 parts of linseed oil, 55 parts of pentaerythritol, 6 parts of triethylamine and 100 parts of toluene, and they were mixed to form a uniform solution. Then, 230 parts of p-octylphenol and 70 parts of formaldehyde were added, and the mixture was maintained at 100° C. for 3 hours. Then, while removing toluene and water from the reaction system, the mixture was heated to 250° C. over 4 hours and then maintained at 250° to 260° C. for 8 hours to perform esterification reaction while removing water of condensation. The resulting resin had an acid value of 16 and a softening point of 94° C.

EXAMPLE 3

A 2-liter four-necked flask equipped with a stirrer, a thermometer and a refluxing device was charged with 500 parts of rosin, 50 parts of dehydrated castor oil, 50 parts of glycerol, 6 parts of triethylamine and 150 parts of toluene, and they were mixed to form a uniform solution. Then, 200 parts of p-octylphenol and 50 parts of formaldehyde were added, and the mixture was maintained at 100° C. for 3 hours. While removing toluene and water from the reaction system, the mixture was heated to 250° C. over 4 hours, and then maintained at 250° to 260° C. for 8 hours to perform esterification reaction while removing water of condensation. The resulting resin had an acid value of 22 and a softening point of 146° C.

EXAMPLE 4

A 2-liter four-necked flask equipped with a stirrer, a thermometer and a refluxing device was charged with 500 parts of rosin, 200 parts of castor oil, 50 parts of glycerol, 6 parts of triethylamine and 100 parts of toluene, and they were mixed to form a uniform solution. Then, 225 parts of p-tertiary butyl phenol and 75 parts of formaldehyde were added, and the mixture was maintained at 100° C. for 3 hours. Then, while removing toluene and water from the reaction system, the mixture was heated to 250° C. over 4 hours and maintained at 250° to 260° C. for 8 hours to perform esterification reaction while removing water of condensation. The resulting resin had an acid value of 16 and a softening point of 110° C.

EXAMPLE 5

A 2-liter four-necked flask equipped with a stirrer and a thermometer was charged with 500 parts of rosin, 200 parts of castor oil and 50 parts of glycerol, and the mixture was heated to 250° C. over 5 hours and then maintained at 250° to 260° C. for 3 hours to perform esterification reaction while removing water of condensation. Immediately then, the reaction mixture was cooled to 50° C. The resulting resin (oil-modified rosin ester) had an acid value of 47.

Then, 6 parts of triethylamine and 100 parts of toluene were added further, and a refluxing device was attached to the flask. The resin was uniformly dissolved in the solvent, and then 225 parts of p-tertiary butyl phenol and 75 parts of formaldehyde were added. The mixture was maintained at 100° C. for 3 hours. While removing toluene and water from the reaction system, the mixture was heated to 250° C. and maintained at 250° to 260° C. for 6 hours to perform esterification reaction while removing water of condensation. The resulting resin had an acid value of 20 and a softening point of 111° C.

EXAMPLE 6

A 2-liter four-necked flask equipped with a stirrer, a thermometer and a refluxing device was charged with 500 g of rosin, 200 parts of linseed oil, 55 parts of pentaerythritol, 200 parts of a hydrocarbon resin (Quinton 1325, a tradename for a product of Nippon Zeon Co., Ltd.), 6 parts of triethylamine and 200 parts of toluene, and they were mixed to form a uniform solution. Then, 230 parts of p-octylphenol and 70 parts of formaldehyde were added, and the mixture was maintained at 100° C. for 3 hours. While removing toluene and water out of the reaction system, the mixture was heated to 250° C. over 4 hours, and then maintained at 250° to 260° C. for 8 hours to perform esterification reaction while removing water of condensation. The resulting resin had an acid value of 9 and a softening point of 115° C.

EXAMPLE 7

A 2-liter four-necked flask equipped with a stirrer, a thermometer and a refluxing device was charged with 250 parts of rosin, 400 parts of linseed oil, 25 arts of glycerol, 4 parts of triethylamine and 100 parts of toluene, and they were uniformly dissolved. Then, 100 parts of p-octylphenol and 25 parts of formaldehyde were added, and the mixture was maintained at 100° C. for 3 hours. While removing toluene and water from the reaction system, the temperature was raised to 250° C. over the course of 4 hours. At 250° to 260° C., the esterification reaction was carried out for 8 hours while removing water of condensation. The resulting resin had an acid value of 7, and was a clear highly viscous liquid (about 300 poises at 25° C.).

EXAMPLE 8

A 2-liter four-necked flask equipped with a stirrer, a thermometer, and a refluxing device was charged with 166 parts of rosin, 700 parts of linseed oil, 13 parts of pentaerythritol, and 4 parts of triethylamine, and they were uniformly dissolved. Then, 105 parts of p-tert.butyl phenol and 35 parts of formaldehyde were added, and the mixture was maintained at 100° C. for 3 hours. While removing water from the reaction system, the temperature was raised to 250° C. over the course of 4 hours. At 250° to 260° C., the esterification reaction was carried out for 5 hours while removing water of condensation. The resulting resin had an acid value of 4, and was a clear highly viscous liquid (about 60 poises at 25° C.).

COMPARATIVE EXAMPLE 1

A 2-liter four-necked flask equipped with a stirrer, a thermometer and a reflux condenser was charged with 500 parts of rosin, 50 parts of glycerol, 6 parts of triethylamine and 100 parts of toluene, and they were mixed to form a uniform solution. Then, 225 parts of p-tertiary butyl phenol and 75 parts of formaldehyde were added, and the mixture was maintained at 100° C. for 3 hours. Then, while removing toluene and water out of the reaction system, the mixture was heated to 250° C. over 4 hours, and maintained at 250° to 260° C. for 12 hours to perform esterification reaction while removing water of condensation. The resulting resin had an acid value of 20 and a softening point of 173° C.

COMPARATIVE EXAMPLE 2

A 2-liter four-necked flask equipped with a stirrer, a thermometer, a dropping funnel and a refluxing device was charged with 500 g of rosin, and it was heated to 160° C. Then, while maintaining the same temperature, 250 g (as solids) of a resol-type initial condensation product of p-octylphenol and formaldehyde was added dropwise over 2 hours from the dropping funnel, and after the addition, the mixture was maintained at this temperature for 1 hour. Furthermore, 50 g of glycerol was added. The mixture was heated to 250° C. over 4 hours, and maintained at 250° to 260° C. for 12 hours to perform esterification reaction while removing water of condensation. The resulting resin had an acid value of 20 and a softening point of 162° C.

COMPARATIVE EXAMPLE 3

A 2-liter four-necked flask equipped with a stirrer, a thermometer, a dropping funnel and a refluxing device was charged with 500 g of rosin and it was heated to 160° C. Then, while maintaining the same temperature, 300 g (as solids) of a resol-type initial condensation product of p-tertiary butyl phenol and formaldehyde was added dropwise over 2 hours from the dropping funnel, and after the addition, the mixture was maintained at this temperature for 1 hour. Furthermore, 50 g of glycerol was added. The mixture was heated to 250° C. over 4 hours, and maintained at 250° to 260° C. for 12 hours to perform esterification reaction while removing water of condensation. The resulting resin had an acid value of 22 and a softening point of 172° C.

EXAMPLE 9

210 parts of the oil-modified and rosin-modified phenolic resin obtained in Example 7 was cold-blended with 90 parts of the rosin-modified phenolic resin obtained in Comparative Example 2 to prepare a resin composition having an oil content of 35% for use in printing ink.

EXAMPLE 10

150 parts of the oil-modified and rosin-modified phenolic resin obtained in Example 8 was cold-blended with 150 parts of the rosin-modified phenolic resin obtained in Comparative Example 3 to prepare a resin composition having an oil content of 35% for use in printing ink.

EXAMPLE 11

210 parts of the oil-modified and rosin-modified phenolic resin obtained in Example 7 was cold-blended with 90 parts of hydrocarbon resin "Neopolymer CP-1" to prepare a resin composition having an oil content of 35% for use in printing inks.

EXAMPLE 12

150 parts of the oil-modified and rosin-modified phenolic resin obtained in Example 8 was cold-blended with 150 parts of a hydrocarbon resin ("Quinton 1325", a product of Nippon Zeon Co., Ltd.) to prepare a resin composition having an oil content of 35% for use in printing inks.

EXAMPLE 13

500 g of the oil-modified and rosin-modified phenolic resin obtained in Example 1 was melt-mixed with 2.5 g of 4,4'-thio-bis-(6-t-butyl-3-methylphenol) at 200° C. for 5 minutes. The resulting composition was cooled to room temperature and then pulverized to a size smaller than 100 mesh.

EXAMPLE 14

500 g of the oil-modified and rosin-modified phenolic resin obtained in Example 2 was melt-mixed with 5 g of 2,6-di-t-butyl-4-methylphenol at 150° C. for 5 minutes. The resulting composition was cooled to room temperature, and pulverized to a size smaller than 100 mesh.

COMPARATIVE EXAMPLE 4

500 g of the oil-modified and rosin-modified phenolic resin obtained in Example 1 was pulverized to a size smaller than 100 mesh.

COMPARATIVE EXAMPLE 5

500 g of the oil-modified and rosin-modified phenolic resin obtained in Example 2 was pulverized to a size smaller than 100 mesh.

COMPARATIVE EXAMPLE 6

500 g of the rosin-modified phenolic resin obtained in Comparative Example 2 and not modified with an oil was pulverized to a size smaller than 100 mesh.

The various properties of the resins and resin compositions obtained in the above Examples and Comparative Examples were tested comparatively. The results are shown in Tables 2 and 3.

Varnishes and inks were prepared by the following methods, and the properties of the resins were tested and evaluated by the following methods.

PREPARATION OF A VARNISH

The rosin-modified phenolic resin in each of the Comparative Examples was cooked at 250° C. for 1 hour in accordance with the following conventional formulation, and then dissolved in a solvent.

| | |
|---|---|
| Rosin-modified phenolic resin | 45 parts |
| Linseed oil | 25 parts |
| "Nisseki No. 5 Solvent" (solvent) | 30 parts |
| Aluminum chelate | 1 part |

The oil-modified and rosin-modified phenolic resin in each of the Examples was blended in accordance with the recipes shown in Table 1, and the amount of the oil component was made equal to that in the above Comparative Examples. No cooking was required, however, in the Examples, and it was sufficient just to dissolve the ingredients in the solvent.

Then, to each of the solutions in the Examples and Comparative Examples 1 part of aluminum chelate was added. The mixture was gelled at 160° C. for 1 hour to form a varnish.

TABLE 1

| | Example | | | | | | | | | | | | Comparative Example |
|---|---|---|---|---|---|---|---|---|---|---|---|---|---|
| | 1 | 2 | 3 | 4 | 5 | 6 | 9 | 10 | 11 | 12 | 13 | 14 | 1 2 3 4 5 6 |
| Resin | 50 | 56 | 48 | 56 | 56 | 54 | 70 | 70 | 70 | 70 | 50 | 56 | 45 |
| Linseed oil | 20 | 14 | 22 | 14 | 14 | 16 | 0 | 0 | 0 | 0 | 20 | 14 | 25 |
| Solvent | | | | | | 30 | | | | | | | 30 |
| Aluminum chelate | | | | | | 1 | | | | | | | 1 |
| Total oil content | | | | | | 25% | | | | | | | 25% |

PREPARATION OF AN INK

Using a three-roll mill, the following ingredients were kneaded to form an ink.

| | |
|---|---|
| "Carmine 6B" (pigment) | 20 parts |
| Varnish | 65 parts |
| Wax | 5 parts |

| No. 5 solvent | required amount |
|---|---|

The amount of No. 5 solvent was the one required to adjust the tack value of the ink to 11-12 and its flow value to 31-33.

STORAGE STABILITY OF THE INK

The ink was stored for 1 week in a closed vessel at room temperature. The difference of the flow value of ink after storage for one week from that immediately after the ink preparation was determined and used as a measure of the stability of the ink.

GLOSS

The ink (0.4 ml) was spread on art paper by an RI tester, and maintained for 24 hours at 20° C. and 65% RH. The gloss of the ink on the art paper was measured by at 60°-60° glossmeter.

SET

The ink (0.4 ml) was spread on art paper by an RI tester, and then superimposed on art paper using an RI tester roller. The degree of ink adhesion was observed, and the time (minutes) which elapsed until the ink no longer adhered to the art paper was measured.

The samples prepared in Examples 13 and 14 and Comparative Examples 4, 5 and 6 were each stored at 50° C. in the air, and their changes with time were observed with regard to the following two items.

(1) Changes in viscosity when the sample was diluted to 50% with toluene (Gardner-Holdt scale at 25° C.).

(2) Changes in the solubility in n-heptane of a solution of the sample diluted to 50% with toluene (heptane diluting degree at 25° C.).

The results are summarized in Tables 2 and 3.

TABLE 2

| Ink test | Example | | | | | | | | | | Comparative Example | | |
|---|---|---|---|---|---|---|---|---|---|---|---|---|---|
| | 1 | 2 | 3 | 4 | 5 | 6 | 9 | 10 | 11 | 12 | 1 | 2 | 3 |
| Storage stability | 0.5 | 0.4 | 0.5 | 0.3 | 0.3 | 0.4 | 0.5 | 0.5 | 0.7 | 1.2 | 1.7 | 1.5 | 1.8 |
| Gloss | 77 | 79 | 78 | 79 | 79 | 76 | 76 | 77 | 72 | 71 | 63 | 67 | 62 |
| Set time (min.) | 10 | 10 | 10 | 10 | 10 | 11 | 10 | 10 | 7 | 5 | 10 | 15 | 10 |

TABLE 3

| Storage time (days) at 50° C. | Example | | Comparative Example | | |
|---|---|---|---|---|---|
| | 13 | 14 | 4 | 5 | 6 |
| 50% diluted solution | | | | | |
| Changes in viscosity | 0 | D | A | D | A | K |
| | 1 | D | A | F | D | K |
| | 3 | D | A | A gel formed. | A gel formed. | K |

TABLE 3-continued

| | Storage time (days) at 50° C. | Example 13 | Example 14 | Comparative Example 4 | Comparative Example 5 | Comparative Example 6 |
|---|---|---|---|---|---|---|
| | 7 | $D^2$-E | A-B | A gel formed. | A gel formed. | K |
| | 15 | D-E | A-B | A gel formed. | A gel formed. | $K^2$-L |
| Changes in | 0 | 295 | 410 | 300 | 400 | 205 |
| the degree | 1 | 300 | 405 | 210 | 280 | 200 |
| of dilution | 3 | 300 | 395 | 150 | 120 | 185 |
| with | 7 | 290 | 385 | 100 | 90 | 185 |
| heptane (%) | 15 | 285 | 380 | 75 | 60 | 170 |
| Ink tests | | | | | | |
| Storage | 0 | 0.5 | 0.4 | 0.5 | 0.4 | 1.5 |
| stability | 1 | 0.4 | 0.4 | 0.9 | 1.2 | 1.5 |
| | 3 | 0.5 | 0.5 | Ink preparation was im- | | 1.6 |
| | 7 | 0.5 | 0.4 | possible because of the | | 1.6 |
| | 15 | 0.6 | 0.4 | formation of a gel. | | 1.7 |
| Gloss | 0 | 77 | 79 | 77 | 79 | 67 |
| | 1 | 77 | 78 | 75 | 73 | 68 |
| | 3 | 78 | 80 | Ink preparation was im- | | 67 |
| | 7 | 77 | 78 | possible because of the | | 67 |
| | 15 | 78 | 79 | formation of a gel. | | 67 |
| Set time | 0 | 10 | 10 | 10 | 10 | 15 |
| (minutes) | 1 | 10 | 10 | 10 | 10 | 15 |
| | 3 | 10 | 10 | Ink preparation was im- | | 15 |
| | 7 | 10 | 10 | possible because of the | | 15 |
| | 15 | 10 | 10 | formation of a gel. | | 15 |

What we claim is:

1. A process for preparing a rosin modified phenolic resin modified with an animal or vegetable oil which comprises reacting in a single step (a) an animal or vegetable oil having an iodine value of 100 to 210 or containing a hydroxyl group, (d) a rosin, (e) an alcohol, and optionally, at least one of (f) acids and (g) hydrocarbon resins, at a temperature of from 100° to 160° C. for 1 to 9 hours and then further reacting at 200° to 280° C. for from 3 to 10 hours, without reacting the phenol (a) or the formaldehyde yielding substance (b), in advance.

2. A process for preparing a rosin modified phenolic resin modified with an animal or vegetable oil which comprises at least partially esterifying at least two of the following components (d), (e), (f) and (g) which are esterifiable with each other: (d) a rosin, (e) an alcohol, (f) an acid, and (g) a hydrocarbon resin, at a temperature of 200° to 260° C., to form a pre-condensate (h); and reacting the pre-condensate (h) with a phenol (a), a formaldehyde-yielding substance (b) and an animal or vegetable oil having an iodine value of 100 to 210 or containing a hydroxyl group, (c) and optionally any one of said components (d), (e), (f) and (g) which was not used to prepare said pre-condensate (h).

3. A process for preparing a rosin modified phenolic resin modified with an animal or vegetable oil which comprises reacting an animal or vegetable oil having an iodine value of 100 to 210 or containing a hydroxyl group (c) and an alcohol (e) at a temperature of from 230° to 240° C. to form an ester-interchange product (i) and reacting said ester-interchange product (i) with a phenol (a) and a formaldehyde-yielding substance (b) and at least one of (d) a rosin, (f) an acid and (g) a hydrocarbon resin at a temperature of 100° to 160° C. for from 1 to 9 hours and then at a temperature of from 200° to 280° C. for from 3 to 9 hours.

4. A resin composition for printing inks, said composition comprising a rosin-modified phenolic resin modified with an animal or vegetable oil which is prepared by the process of claim 1.

5. A resin composition for printing inks, said composition comprising a rosin-modified phenolic resin modified with an animal or vegetable oil which is prepared by the process of claim 2.

6. A resin composition for printing inks, said composition comprising a rosin-modified phenolic resin modified with an animal or vegetable oil which is prepared by the process of claim 3.

* * * * *